United States Patent
Ng et al.

(10) Patent No.: US 11,620,490 B2
(45) Date of Patent: Apr. 4, 2023

(54) MULTI-LAYER NEURAL NETWORK PROCESSING BY A NEURAL NETWORK ACCELERATOR USING HOST COMMUNICATED MERGED WEIGHTS AND A PACKAGE OF PER-LAYER INSTRUCTIONS

(71) Applicant: Xilinx, Inc., San Jose, CA (US)

(72) Inventors: Aaron Ng, San Jose, CA (US); Elliott Delaye, San Jose, CA (US); Ehsan Ghasemi, San Jose, CA (US); Xiao Teng, Cupertino, CA (US); Jindrich Zejda, Saratoga, CA (US); Yongjun Wu, Cupertino, CA (US); Sean Settle, San Jose, CA (US); Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1292 days.

(21) Appl. No.: 15/785,800

(22) Filed: Oct. 17, 2017

(65) Prior Publication Data
US 2019/0114529 A1  Apr. 18, 2019

(51) Int. Cl.
*G06N 3/04* (2006.01)
*G06N 3/08* (2006.01)
*G06N 3/063* (2006.01)

(52) U.S. Cl.
CPC ............ *G06N 3/04* (2013.01); *G06N 3/0454* (2013.01); *G06N 3/063* (2013.01); *G06N 3/08* (2013.01)

(58) Field of Classification Search
CPC ........ G06N 3/04; G06N 3/0454; G06N 3/063; G06N 3/08
See application file for complete search history.

(56) References Cited

U.S. PATENT DOCUMENTS 6,346,825 B1   2/2002  Pang et al.
2016/0198000 A1*  7/2016  Gorshechnikov ..... H04L 43/045
                                                            709/208

(Continued)

FOREIGN PATENT DOCUMENTS

CN  PCT/CN2017/100201  *  9/2017
CN       107239823 A      10/2017

OTHER PUBLICATIONS

Chakradhar, Srimat, et al. "A dynamically configurable coprocessor for convolutional neural networks." Proceedings of the 37th annual international symposium on Computer architecture. 2010. (Year: 2010).*

(Continued)

*Primary Examiner* — Markus A. Vasquez
(74) *Attorney, Agent, or Firm* — Crawford Maunu PLLC (57) ABSTRACT

In the disclosed methods and systems for processing in a neural network system, a host computer system writes a plurality of weight matrices associated with a plurality of layers of a neural network to a memory shared with a neural network accelerator. The host computer system further assembles a plurality of per-layer instructions into an instruction package. Each per-layer instruction specifies processing of a respective layer of the plurality of layers of the neural network, and respective offsets of weight matrices in a shared memory. The host computer system writes input data and the instruction package to the shared memory. The neural network accelerator reads the instruction package from the shared memory and processes the plurality of per-layer instructions of the instruction package.

14 Claims, 9 Drawing Sheets

(56) References Cited

U.S. PATENT DOCUMENTS

| | | | |
|---|---|---|---|
| 2017/0124452 A1* | 5/2017 | Tucker | G06N 3/08 |
| 2017/0220352 A1* | 8/2017 | Woo | G06F 9/3455 |
| 2018/0046895 A1* | 2/2018 | Xie | G06N 3/04 |
| 2018/0046900 A1* | 2/2018 | Dally | G06F 9/30018 |
| 2018/0046913 A1* | 2/2018 | Yu | G06N 3/0454 |
| 2018/0107919 A1* | 4/2018 | Paul | G06N 3/04 |
| 2018/0121796 A1* | 5/2018 | Deisher | G06N 3/0472 |
| 2018/0173571 A1* | 6/2018 | Huang | G06N 3/084 |
| 2019/0050717 A1* | 2/2019 | Temam | G06N 3/0481 |

OTHER PUBLICATIONS

Chen, Yunji et al., "DaDiaNao: A Machine-Learning Supercomputer," Proc. of the 2014 47th Annual IEEE/ACM International Symposium on Microarchitecture, Dec. 13, 2014, pp. 609-622, IEEE Computer Society, Washington, DC, USA.

Du, Zidong et al., "ShiDianNao," Proc. of the 42nd Annual International Symposium on Computer Architecture, Jun. 13, 2015, pp. 92-104, IEEE, New York, New York, USA.

Peemen, Maurice et al., "Memory-centric accelerator design for Convolutional Neural Networks," Proc. of the 2013 IEEE 31st International Conference on Computer Design, Oct. 6, 2013, pp. 13-19, IEEE, Piscataway, New Jersey, USA.

Qiu, Jiantao et al., "Going Deeper with Embedded FPGA Platform for Convolutional Neural Networks," Proc. of the 2016 ACM/SIGDA International Symposium on Field-Programmable Gate Arrays, Feb. 21, 2016, pp. 26-35, ACM Press, New York, New York, USA.

Shen, Yongmin et al., "Mazimizing CNN Accelerator Efficiency Through Resource Partitioning," Proc. of the 44th Annual International Symposium on Computer Architecture, Jun. 24, 2017, pp. 535-547, ACM Press, New York, New York, USA.

Li, Zhen et al., "A Survey of Neural Network Accelerators," Frontiers of Computer Science, May 17, 2017, pp. 746-761, vol. 11, Springer Berlin, Berlin/Heidelberg, Germany.

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 2012, pp. 1097-1105, ACM Digital Library, www.acm.org.

Mathworks, "im2col," downloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/, pp. 1-15.

Shaaban, Muhammed, "Systolic Architectures," Mar. 11, 2003, Kate Gleason College of Engineering, Rochester Institute of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

* cited by examiner

FIG. 10

MULTI-LAYER NEURAL NETWORK PROCESSING BY A NEURAL NETWORK ACCELERATOR USING HOST COMMUNICATED MERGED WEIGHTS AND A PACKAGE OF PER-LAYER INSTRUCTIONS

TECHNICAL FIELD

The disclosure generally relates to neural network processing.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tank) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Field programmable gate arrays (FPGAs) have been used to implement circuits that accelerate functions called from software. Circuits that accelerate functions called from software are referred to as hardware accelerators. Examples of hardware accelerators include various image filters implemented as FPGA circuits that can be called from image processing software.

An FPGA-based implementation involves the transfer of the weights and input data to FPGA-accessible memory by a host computer system, and the transfer of output data to host computer system. The transfer of data between the host computer system and an FPGA accelerator can degrade performance. Compared to other commonly used neural network (NN) implementations such as on a CPU or a GPU, an FPGA-based implementation can be advantageous because an FPGA circuit can process data faster than a GPU and consume less power in the process.

SUMMARY

A disclosed method of processing in a neural network system includes writing by a host computer system, a plurality of weight matrices associated with a plurality of layers of a neural network to a memory shared with a neural network accelerator. The host computer system further assembles a plurality of per-layer instructions into an instruction package. Each per-layer instruction specifies processing of a respective layer of the plurality of layers of the neural network, and respective offsets of weight matrices in a shared memory. The host computer system writes input data and the instruction package to the shared memory. The neural network accelerator reads the instruction package from the shared memory and processes the plurality of per-layer instructions of the instruction package.

A disclosed neural network processing system includes a shared memory, a host computer system coupled to the shared memory, and a neural network accelerator coupled to the shared memory. The host computer system is configured with instructions that when executed cause the host computer system to write a plurality of weight matrices associated with a plurality of layers of a neural network to the shared memory. The host computer system is also programmed to assemble a plurality of per-layer instructions into an instruction package. Each per-layer instruction specifies processing of a respective layer of the plurality of layers of the neural network, and respective offsets of weight matrices in the shared memory. The host computer system writes input data and the instruction package to the shared memory. The neural network accelerator is configured to read the instruction package from the shared memory and process the plurality of per-layer instructions of the instruction package.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed implementations reduce the overhead and latency associated with a neural network processing system that includes a host computer system and a neural network accelerator. The systems and methods minimize the number of direct memory access (DMA) operations involved in transferring data to and from a memory shared between the host computer system and the neural network accelerator. The host computer system assembles all of the input data and parameters required by all the layers of the neural network for processing and establishes the collection of data and parameters in the shared memory prior to initiation of processing by the neural network accelerator. With a few DMA operations, the neural network accelerator has the data and configuration parameters needed for a complete pass through the neural network, thereby reducing overhead and latency.

The disclosed methods and systems are applicable to convolutional neural networks (CNNs), recurrent neural networks (RNNs) and other neural networks involving operations such as matrix multiplication or convolution. For brevity, the host computer system may also be referred to as a "host," and a neural network accelerator may also or alternatively be referred to as an "acceleration circuit," a "kernel accelerator" or "kernel accelerator circuit."

An exemplary application of the disclosed systems and methods is a convolutional neural network (CNN). A CNN can be represented as a directed graph having layers of operations. Each layer can entail one or more operations, such as CONV (Convolution), or image-to-column conversion ("im2col"), general matrix multiplication ("GEMM"), activation (e.g., a rectified linear unit, "ReLU" function), pooling (e.g., "maxpool"), local response normalization (LRN layer), and inner product (e.g., "fully connected" (FC) layer). The inputs to each layer are data, such as images or voice samples, and trained weights, all represented as matrices. In the disclosed systems and methods, all the weight matrices, configuration parameters, and input data to be processed per all the layers of the neural network are provided from the host to the neural network accelerator prior to the neural network accelerator initiating neural network processing of the input data.

In one feature of the disclosed systems and methods, the separate weight matrices, which are used in convolution or matrix multiplication in the different layers of the neural network, are merged into a single block of data and stored in a contiguous address space of the shared memory. The combined weight matrices allow the neural network accelerator to sequentially access the required weights, which is more efficient than accessing non-contiguous addresses. The contiguous address space also allows access without having to wait for a new weight matrix to be loaded as the kernel processor transitions from the processing of one layer of the neural network to the processing of the next layer.

In another feature, the host computer system creates a package of multiple per-layer instructions to control processing by the neural network accelerator. The processing by the neural network accelerator can thereby be customized according to the neural network application. In addition, the package of per-layer instructions reduces the number of interactions between the host and the neural network accelerator in processing input data through the layers of the neural network. The package of per-layer instructions further specifies offsets into the block of weight matrices in order to provide quick reference to the proper weight matrix by each per-layer instruction.

A buffer is shared between layers of the neural network for storing input data ("B matrix") and output data ("C matrix"). The shared "B/C buffer" reduces memory requirements and improves efficiency of the neural network accelerator by avoiding need to copy results of one layer to the input buffer of the next layer. The neural network accelerator alternates between the portion of the B/C buffer that is used for the B matrix and the portion of the B/C buffer that is used for the C matrix as processing transitions from one layer to the next layer.

Figure 1:
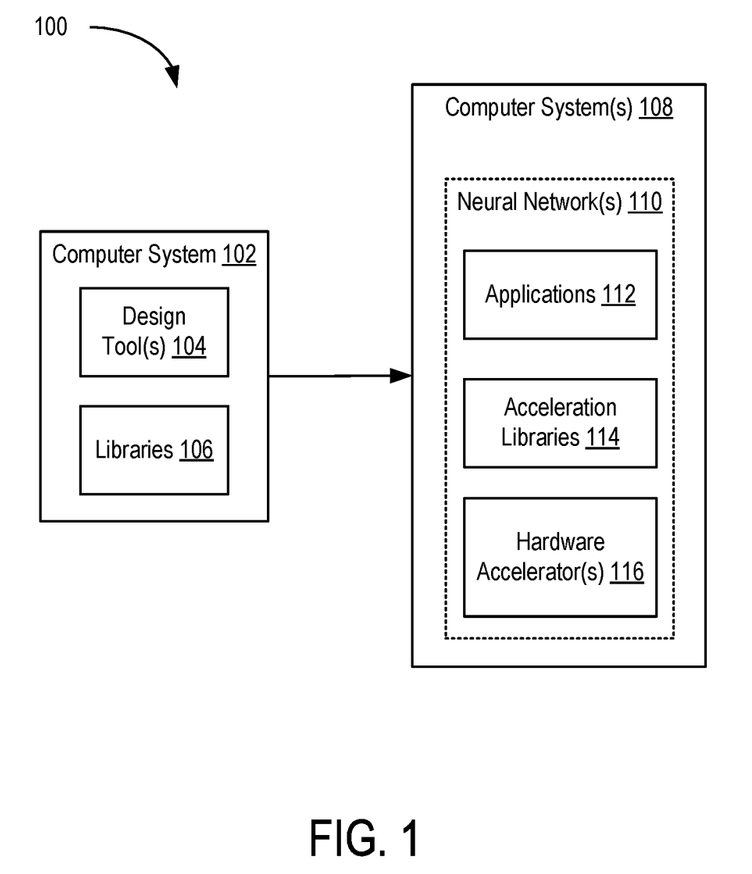
FIG. 1 is a block diagram depicting a system for implementing neural networks according to an example.

Turning now to the drawings, FIG. 1 is a block diagram depicting a system 100 for implementing neural networks according to an example. The system 100 includes a computer system 102 and one or more computer systems 108. The computer system 102 includes conventional computing components configured to execute software that provides one or more design tools 104. Each computer system 108 implements one or more neural networks 110. The neural network(s) 110 are implemented using applications 112, acceleration libraries 114, and one or more hardware accelerators 116.

In an example, the hardware accelerator(s) 116 include programmable integrated circuits (ICs), such as field programmable gate arrays (FPGAs). The acceleration libraries 114 provide application programming interfaces (APIs) to interface with the hardware accelerator(s) 116. The acceleration libraries 114 can also include libraries that provide neural network functions, including predefined and optimized implementations of neural network layers and other types of neural network structures. Thus, the neural network(s) 110 can include both hardware portions implemented in the hardware accelerator(s) 116, as well as software portions implemented in the acceleration libraries 114. The applications 112 invoke the APIs of the acceleration libraries 114 to program and control the hardware accelerator(s) 116 to implement the neural network(s) 116.

A designer interacts with the design tool(s) 104 to define the neural network(s) 110. The design tool(s) 104 can generate files for programming the hardware accelerator(s) 116 (e.g., configuration bitstreams for FPGAs), files that provide the acceleration libraries 114, and files that provide the applications 112. The designer can define the hardware portions of the neural network(s) 110 using a register transfer language (RTL) or using a programming language, such as C, C++, OpenCL, and the like, or a combination of RTL and programmable language(s). The user can define the software portions of the neural network(s) 110 using a programming language, such as C, C++, OpenCL, etc. The design tool(s) 104 compile the software-defined neural networks to generate files for programming the hardware accelerator(s) 116 and library files for the acceleration libraries 114. The designer can make use of libraries 106 that provide class libraries, template libraries, and the like to assist in developing the hardware and software portions of the neural network(s) 110.

A user can define the applications 112 using a programming language (e.g., C, C++, Python, etc.). The user can make use of neural network frameworks and libraries, such as Caffe, TensorFlow, MXNet, and the like.

Figure 2:
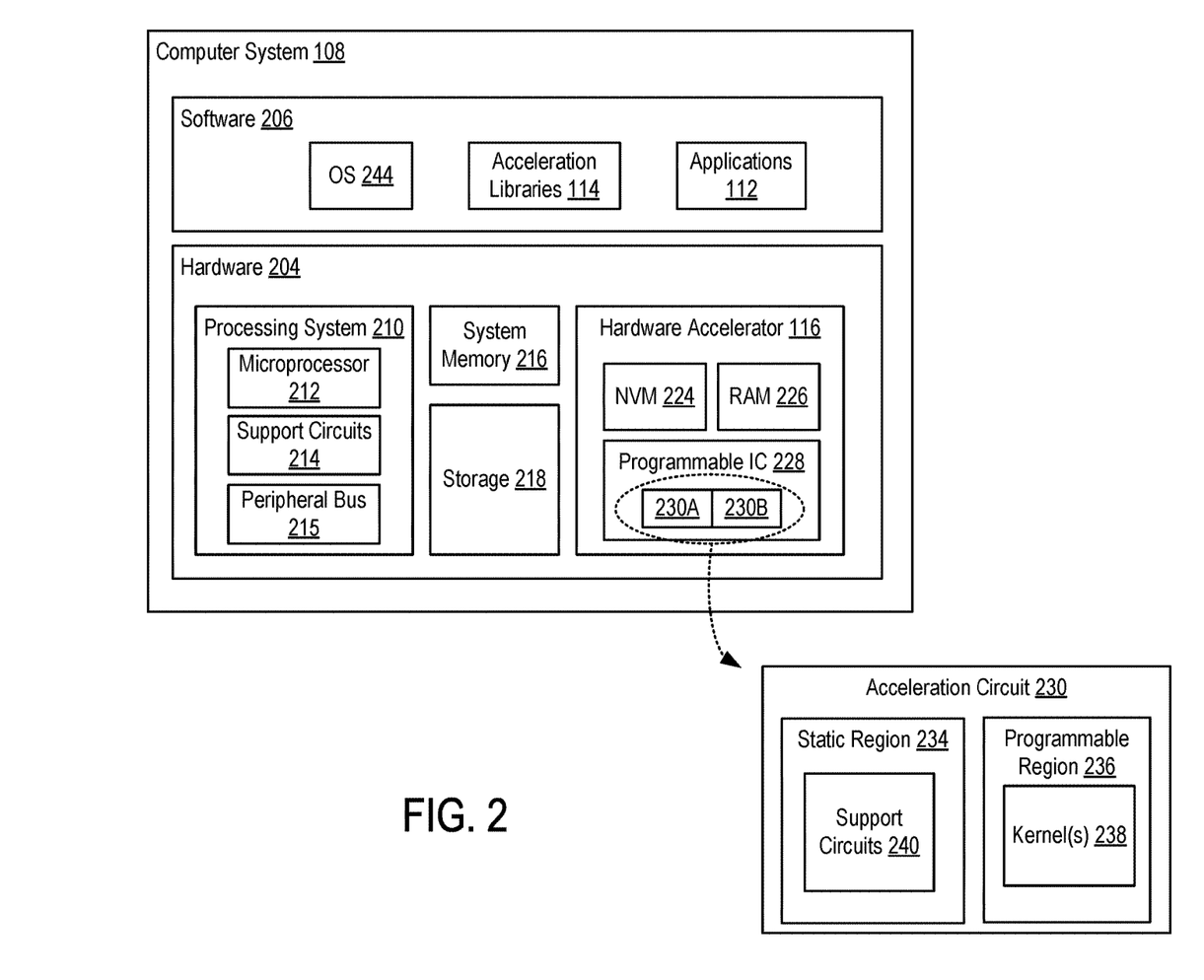
FIG. 2 is a block diagram depicting a computing system according to an example.

FIG. 2 is a block diagram depicting a computing system 108 according to an example. The computing system 108 includes hardware 204 and software 206 executing on the hardware 204. The hardware 204 includes a processing system 210, system memory 216, storage devices ("storage 218"), and a hardware accelerator 116. The software 206 includes an operating system (OS) 244, the acceleration libraries 114, and the applications 112. The processing system 210, system memory 216, and storage 218 comprise a host computer system as referenced herein.

The processing system 210 includes a microprocessor 212, support circuits 214, and a peripheral bus 215. The microprocessor 212 can be any type of general-purpose central processing unit (CPU), such as an x86-based processor, ARM®-based processor, or the like. The microprocessor 212 can include one or more cores and associated circuitry (e.g., cache memories, memory management units (MMUs), interrupt controllers, etc.). The microprocessor 212 is configured to execute program code that perform one or more operations described herein and which can be stored in the system memory 216 and/or the storage 218. The support circuits 214 include various devices that cooperate with the microprocessor 212 to manage data flow between the microprocessor 212, the system memory 216, the storage 218, the hardware accelerator 116, or any other peripheral device. For example, the support circuits 214 can include a chipset (e.g., a north bridge, south bridge, platform host controller, etc.), voltage regulators, firmware (e.g., a BIOS), and the like. The support circuits 214 manage data flow between the microprocessor 212 and the peripheral bus 215, to which various peripherals, such as the hardware accelerator 116, are connected. In some examples, the microprocessor 212 can be a System-in-Package (SiP), System-on-Chip (SoC), or the like, which absorbs all or a substantial portion of the functionality of the chipset (e.g., north bridge, south bridge, etc.). The peripheral bus 215 can implement an expansion bus standard, such as Peripheral Component Interconnect Express (PCIe). In the example, the processing system 210 is shown separate from the hardware accelerator 116. In other examples discussed further below, the processing system 210 and the hardware accelerator 116 can be implemented on the same integrated circuit (IC) using a System-On-Chip (SoC).

The system memory 216 is a device allowing information, such as executable instructions and data, to be stored and retrieved. The system memory 216 can include, for example, one or more random access memory (RAM) modules, such as double-data rate (DDR) dynamic RAM (DRAM). The storage device 218 includes local storage devices (e.g., one or more hard disks, flash memory modules, solid state disks, and optical disks) and/or a storage interface that enables the computing system 108 to communicate with one or more network data storage systems. The hardware 204 can include various other conventional devices and peripherals of a computing system, such as graphics cards, universal serial bus (USB) interfaces, and the like.

The hardware accelerator 116 includes a programmable IC 228, a non-volatile memory 224, and RAM 226. The programmable IC 228 can be an FPGA or the like or an SoC having an FPGA or the like. The NVM 224 can include any type of non-volatile memory, such as flash memory or the like. The RAM 226 can include DDR DRAM or the like. The programmable IC 228 is coupled to the NVM 224 and the RAM 226. The programmable IC 228 is also coupled to the peripheral bus 215 of the processing system 210.

The OS 244 can be any commodity operating system known in the art, such as such as Linux®, Microsoft Windows®, Mac OS®, or the like. The acceleration libraries 114 includes drivers and libraries that provide APIs for command and control of the hardware accelerator 116. The applications 112 include software executing on the microprocessor 212 that invokes the APIs of the acceleration libraries 114 to implement neural network(s).

In operation, the programmable IC 228 is configured with an acceleration circuit 230. The acceleration circuit 230 generally includes a base platform 230A and a neural network accelerator 230B. For example, the acceleration circuit 230 can be implemented using a static region 234 and a programmable region 236. The static region 234 includes support circuits 240 for providing an interface to the peripheral bus 215, the NVM 224, and the RAM 226. The programmable region 236 can include one or more neural network accelerators ("kernel(s) 238"). The base platform 230A is implemented using the static region 234, and the neural network accelerator 230B is implemented using the programmable region 236. In another example, the base platform 230A can also be implemented using a portion of the programmable region 236. Thus, in some examples, the programmable region 236 also includes some interface circuits. In some examples, the acceleration circuit 230 can include more than one programmable region 236, each of which can be individually configured with neural network accelerator(s) 238.

The static region 234 is "static" in that the circuitry thereof remains constant across reconfigurations of the programmable region 236. In an example, the support circuits 240 include PCIe endpoint circuits, a direct memory access (DMA) controller, interconnects, a memory controller, a memory interface circuit (e.g., a DDR interface), decoupler circuits (to support partial reconfiguration), a flash programmer, debug circuits, and the like. In some examples, the programmable region 236 does not include any of the support circuits 240. In other examples, some support circuits are implemented in the programmable region 236. In such case, the programmable region 236 can be referred to as an "expanded programmable region." In either case, in one example, some support circuits 240 are always present in the static region 234, such as the PCIe circuits and the DMA circuits.

Figure 3:
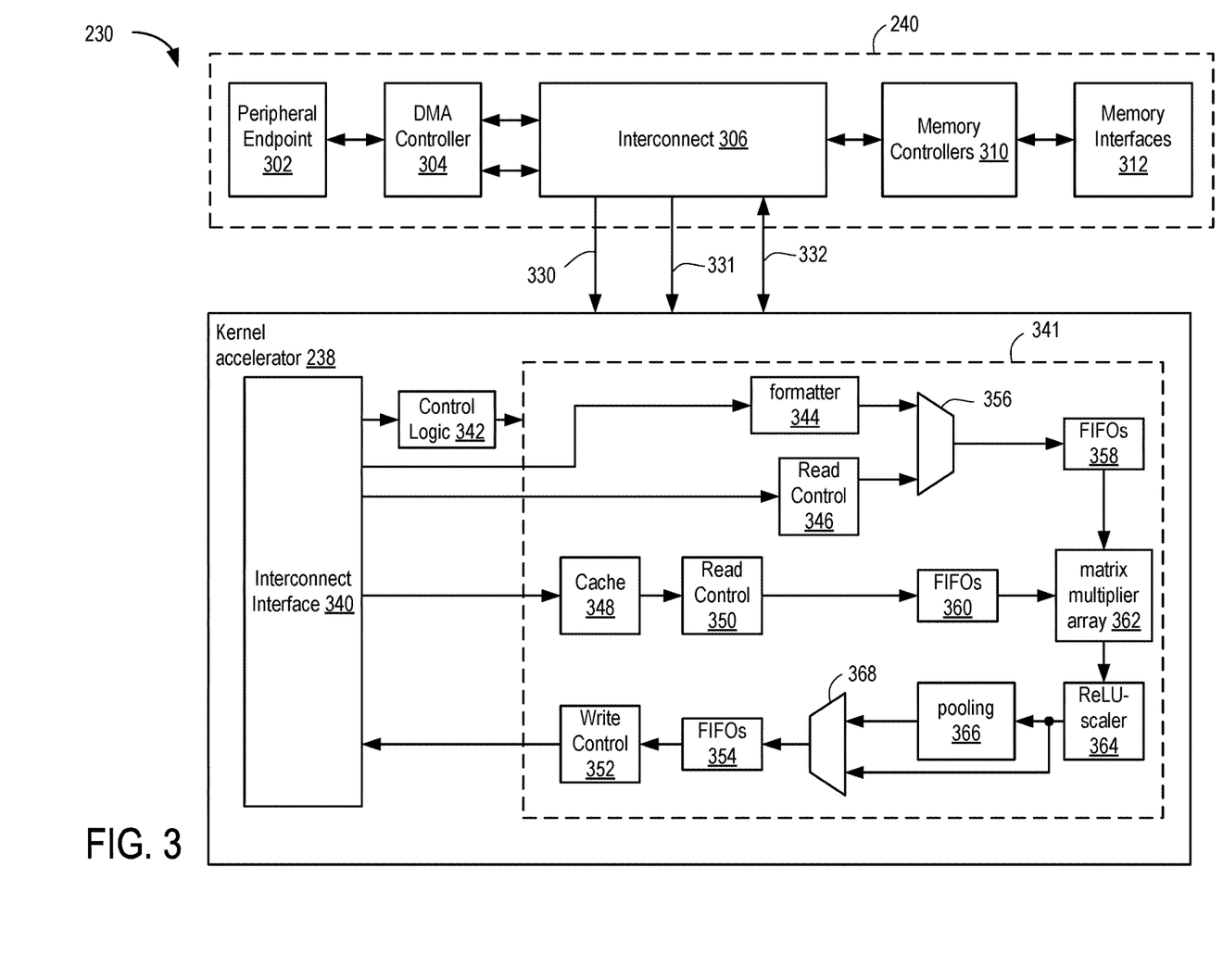
FIG. 3 is a block diagram depicting an acceleration circuit according to an example.

FIG. 3 is a block diagram depicting an acceleration circuit 230, according to an example. The acceleration circuit 230 includes the support circuits 240 and a neural network accelerator 238. In the example, the support circuits 240 include a PCIe endpoint circuit ("PCIe endpoint 302"), a PCIe DMA controller 304, interconnect circuits ("interconnect 306"), memory controllers 310, and memory interfaces 312. The support circuits 240 can include other circuits, which are omitted for clarity (e.g., decoupler circuits, debug circuits, etc.). The PCIe endpoint 302 provides a physical interface to the peripheral bus 215. The PCIe DMA controller 304 facilitates DMA operations to the RAM 226 and the neural network accelerator 238. The interconnect 306 couples the PCIe DMA controller 304 to the memory controllers 310 and to the neural network accelerator 238. The memory controllers 310 are coupled to the memory interfaces 312. The memory interfaces 312 are coupled to the RAM 226.

In operation, the acceleration libraries 114 can access the RAM 226 directly through the PCIe DMA controller 304. The acceleration libraries 114 can also access the neural network accelerator 238 through the PCIe DMA controller 304. The neural network accelerator 238 can access the RAM 226 through the memory controllers 310. Data can be exchanged between the software 206 and the neural network accelerator 238 using DMA operations between the system memory 216 and the RAM 226.

In the example, the neural network accelerator 238 uses interfaces 330, 331, and 332 to communicate with the interconnect 306. In particular, these interfaces include a first read interface 330, a second read interface 331, and a read/write interface 332. For example, the read interface 330 can be used as a control interface for controlling the neural network accelerator 238. The read interface 331 can be used to read from the RAM 226 through a first one of the memory interfaces 312. The read/write interface 332 can be used to read and write from the RAM 226 through a second one of the memory interfaces 312.

The neural network accelerator 238 includes an interconnect interface 304, control logic 342, and processing circuits 341. The processing circuits 341 include a formatter circuit 344 circuit (e.g., IM2COL), a read control circuit ("read control 346"), a multiplexer 356, first-in-first-out circuits ("FIFOs 358"), matrix multiplier array 362, a ReLU-scaler circuit 364, a pooling circuit 366 (e.g., maxpool), a multiplexer 368, FIFOs 354, write control circuit ("write control 352"), a cache 348, a read control circuit ("read control 350"), and FIFOs 360. The interconnect interface 340 is coupled to the interfaces 330, 331, and 332, the control logic 342, and the processing circuits 341. The interconnect interface 340 can include switches, clock converters, and the like to facilitate communication between the control logic 342 and the interface 330, as well as between the processing circuits 341 and the interfaces 331 and 332.

In the example, the interconnect interface 340 is coupled to inputs of the formatter circuit 344, the read control circuit 346, the cache 348, and the write control circuit 352. Outputs of the formatter circuit 344 and the read control circuit 346 are coupled to inputs of the multiplexer 356. An output of the multiplexer 356 is coupled to an input of the FIFOs 358. An output of the FIFOs 358 is coupled to a first input of the matrix multiplier array 362. An output of the cache 348 is coupled to an input of the read control circuit 350. An output of the read control circuit 350 is coupled to an input of the FIFOs 360. An output of the FIFOs 360 is coupled to a second input of the matrix multiplier array 362. An output of the matrix multiplier array 362 is coupled to an input of the ReLU-scaler 364. An output of the ReLU-scaler 364 is coupled to an input of the pooling circuit 366 and an input of the multiplexer 368. An output of the pooling circuit 366 is coupled to another input of the multiplexer 368. An output of the multiplexer 368 is coupled to an input of the FIFOs 354. An output of the FIFOs 354 is coupled to the write control circuit 352.

In operation, the matrix multiplier array 362 performs matrix multiplication operations for implementing a neural network. The inputs of the matrix multiplier array 362 receive input activation matrices from the FIFOs 358 and weight matrices from the FIFOs 360. The input activation matrices can be read directly from the RAM 226 using the read control circuit 346. Alternatively, the input activations can be read from the RAM 226 and processed by the formatter circuit 344 for input to the matrix multiplier array 362. Weight matrices can be read from the RAM 226 by the read control circuit 350 and cached in cache 348. The ReLU-scaler 364 performs an activation function and can scale the output of the matrix multiplier array 362. The pooling circuit 366 can implement a max pooling function on the scaled output of the matrix multiplier array 362. In one example, the pooling circuit 366 is implemented using CLBs or other configurable logic. Either the output of the pooling circuit 366 or the ReLU-scaler 364 can be stored in the FIFOs 354. The write control circuit 352 writes data in the FIFOs to the RAM 226. The control logic 342 controls the various circuits in the processing circuits 341, such as the formatter circuit 344, the read control circuit 346, the multiplexers 356 and 368, the read control circuit 350, the ReLU-scaler 364, the pooling circuit 366, and the write control circuit 352.

Figure 4:
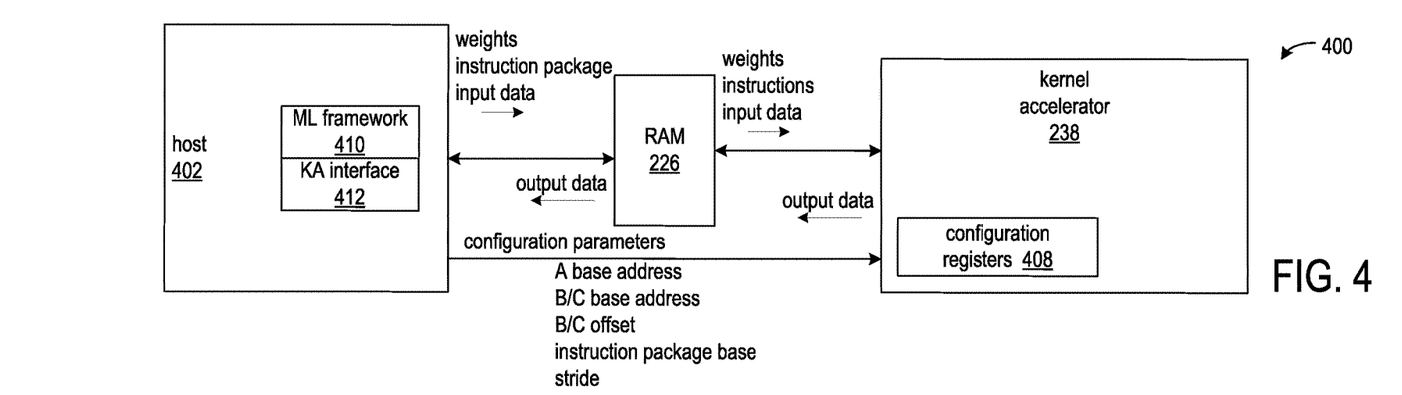
FIG. 4 shows an exemplary neural network processing system according to one implementation.

FIG. 4 shows an exemplary neural network processing system 400 according to one implementation. The system includes a host computer system 402 communicatively coupled to neural network accelerator 238. The host computer system 402 can include the processing system 210, system memory 216, and storage 218 as shown in FIG. 2. The host computer system 402 is specifically programmed by a machine learning (ML) framework 410 and a neural network accelerator (KA) interface 412. The ML framework program, which corresponds to the applications 112 of FIG. 1, specifies a particular neural network application, for example, image or speech processing, and the KA interface, which can be implemented as acceleration libraries as in FIG. 1, initiates neural network operations on the neural network accelerators in response to requests for neural network processing from the ML framework. The neural network accelerator 238 is coupled to RAM 406, through which the host and neural network accelerator communicate. The neural network accelerator has a set of configuration registers 408. The configuration registers are accessible to the KA interface 412 for storing addresses of memory buffers in the RAM 226 and configuration parameters for neural network operations, such as matrix dimensions for general matrix multiplication (GEMM) and the stride/window for convolution.

The disclosed approaches are not limited to any specific hardware platforms. However, for purposes of providing a frame of reference to those skilled in the art, the neural network accelerator can be implemented on a KINTEX® ULTRASCALE™ 115 device, which is available from Xilinx, Inc. The RAM 226 is a DDR SDRAM mounted on a printed circuit board along with the neural network accelerator. The interface between host 402 and the RAM, and between the host and the neural network accelerator is Peripheral Component Interconnect Express (PCIE). The neural network accelerator uses direct memory access (DMA) channels to map some of the host memory to the RAM and to configuration registers 408. The host computer system 402 can be any computer system or combination or network of computer systems suitable for executing an ML framework 410 and KA interface 412. ML frameworks can be specified using programming packages such as Tensor-Flow™, Caffe, and MXNet.

The KA interface 412 receives neural network requests from the ML framework 410 for processing by the neural network accelerator 238. Prior to submitting neural network requests to the neural network accelerator for processing, the KA interface writes the weight matrices associated with the layers of the neural network to the RAM 226 that is shared with the neural network accelerator. All of the weight matrices are written to the shared memory as a contiguous block, which reduces the number of DMA operations and overhead and ensures that the weights are available to the neural network accelerator when the weights are needed for the convolutions or matrix multiplications in the layers of the neural network.

In response to receiving a neural network request from the ML framework 410, the KA interface 412 assembles a group of per-layer instructions into an instruction package and writes the instruction package to the RAM 226. Each per-layer instruction specifies processing of a respective layer of the neural network. In addition, each per-layer instruction specifies a respective offset of a weight matrix from the base address of the combined weight matrices in a shared memory. The processing of each layer of the neural network will access a respective one of the weight matrices. The per-layer instructions also specify configuration parameters for different neural network operations in different layers. For example, the configuration parameters can specify a scaling factor, convolution window and stride, matrix dimensions for maxpool processing, and an activation function. The configuration parameters further include the base address of the instruction package in the RAM. Different layers of the neural network can entail different sets of neural network operations.

The KA accelerator further establishes configuration parameters in the configuration registers 408 of the neural network accelerator. The configuration parameters include the base address of the weight matrices, the base address of the input/output data matrices, and an offset from the base address of the input/output data matrices. A weight matrix is sometimes referred to as "A," an input data matrix is sometimes referred to as "B," and the output data matrix is sometimes referred to as "C."

In response to a signal from the KA interface 412 indicating that a package of instructions is ready to be processed, the neural network accelerator 238 serially processes the per-layer instructions from the instruction package. The package of instructions effectively specifies a program or a state machine according to which the neural network accelerator performs the specified processing of the layers of the neural network.

Figure 5:
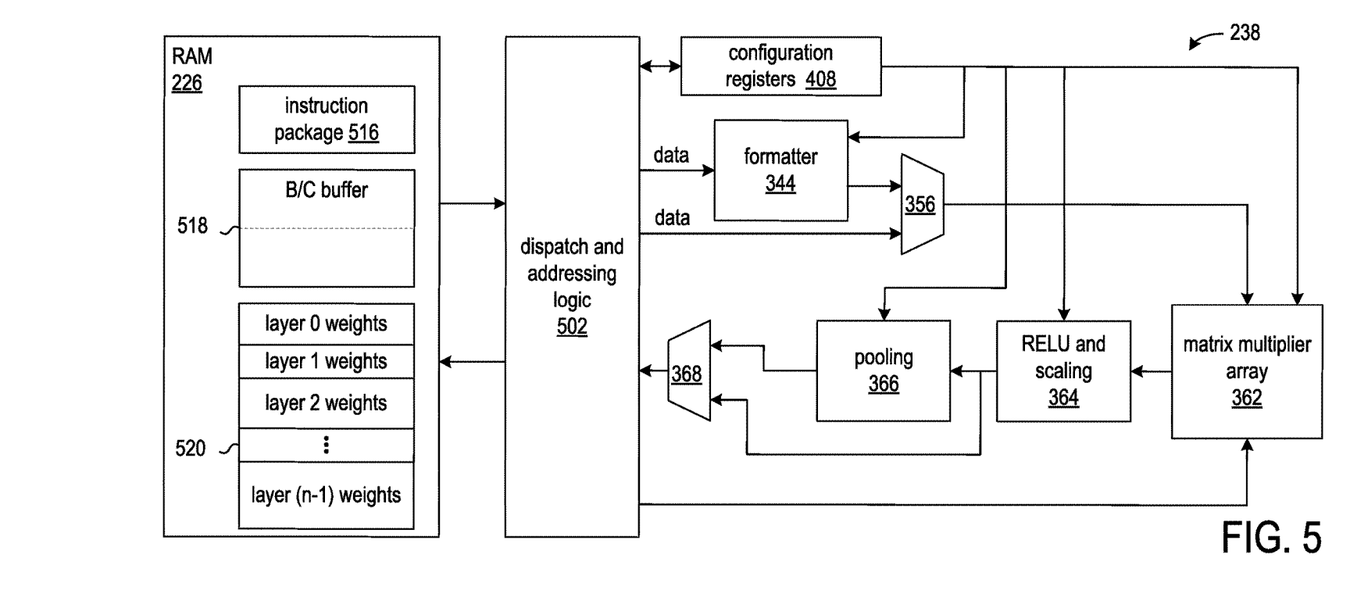
FIG. 5 shows another view of the exemplary neural network accelerator shown in FIG. 3.

FIG. 5 shows another view of the exemplary neural network accelerator 238 of FIG. 3. The merged weight matrices 520 are written by the host and stored in contiguous addresses of the RAM 226. In an exemplary application, the per-layer instructions in the instruction package 516 specify sets of neural network operations to be performed in the layers of the neural network and configuration parameters for scaling, maxpool dimensions, and an activation function. Different sets of neural network operations can be specified in different ones of the per-layer instructions in the instruction package to direct specific per-layer processing by the neural network accelerator.

In processing the per-layer instructions from the instruction package 516, the neural network accelerator processes the instructions serially. For example, a first per-layer instruction is processed followed in succession by processing a second per-layer instruction of the instruction package. In processing the first per-layer instruction, the neural network accelerator 238 reads input data from a first portion of the B/C buffer 518 in the RAM 226 and writes output data to a second portion of the B/C buffer in the RAM. In processing the second per-layer instruction, the neural network accelerator reads input data from the second portion of the B/C buffer and writes the output data to the first portion of the B/C buffer. The neural network accelerator thereafter alternates between portions of the B/C buffer used for input and output data with each successive per-layer instruction.

The neural network accelerator 238 includes configuration registers 408, dispatching and addressing logic circuitry 502 (that implement the read and write controls of FIG. 3), formatter circuit 344, convolution or matrix multiplier circuitry 362, rectifier liner unit (ReLU) and scaling circuit 364, and pooling circuitry 366. Multiplexers 356 and 368 are controlled by the dispatch and addressing logic according to the specified neural network operations. The configuration data in the configuration registers provide configuration parameters for the formatter circuit, matrix multiplier circuitry, ReLU-scaling circuit, and pooling circuitry.

The dispatch and addressing circuit 502 reads a per-layer instruction from the instruction package 516 and initiates the specified neural network operations with the data referenced in the work request. The dispatch and addressing circuit controls multiplexer 356 to select between input data read from the RAM 226 and formatted data from formatter circuit 344, according to the parameters specified in the per-layer instruction. The formatter circuit 344 translates input data from a format provided by the ML framework to a format suitable for the convolution or matrix multiplier circuit 362. For example, in one implementation, the formatter circuit converts image data into column data (im2col). In another implementation, the formatter circuit translates row-major or column-major format to a custom hybrid row/column major format that matches the compute array geometry. The convolution or matrix multiplier circuitry 362 performs matrix multiplication between the input data and a selected weight matrix from the weight matrices 520. In one implementation, the matrix multiplication circuit 362 is a systolic array of multiplier-accumulator circuits. ReLU circuit 364 implements an activation function and a scaling function for the neural network. In an exemplary application, the pooling circuit 366 reduces the spatial size of the data between convolution layers in order to reduce the computational requirements imposed on succeeding layers. Reduction of the spatial size also aids in avoiding overfitting. In an exemplary application, the pooling circuit implements the maxpool function. The dispatch and addressing circuit controls multiplexer 368 to select between data from the ReLU and scaling circuit 364 and data from the pooling circuit 366 for storing as the output matrix in the B/C buffer 518.

Figure 6:
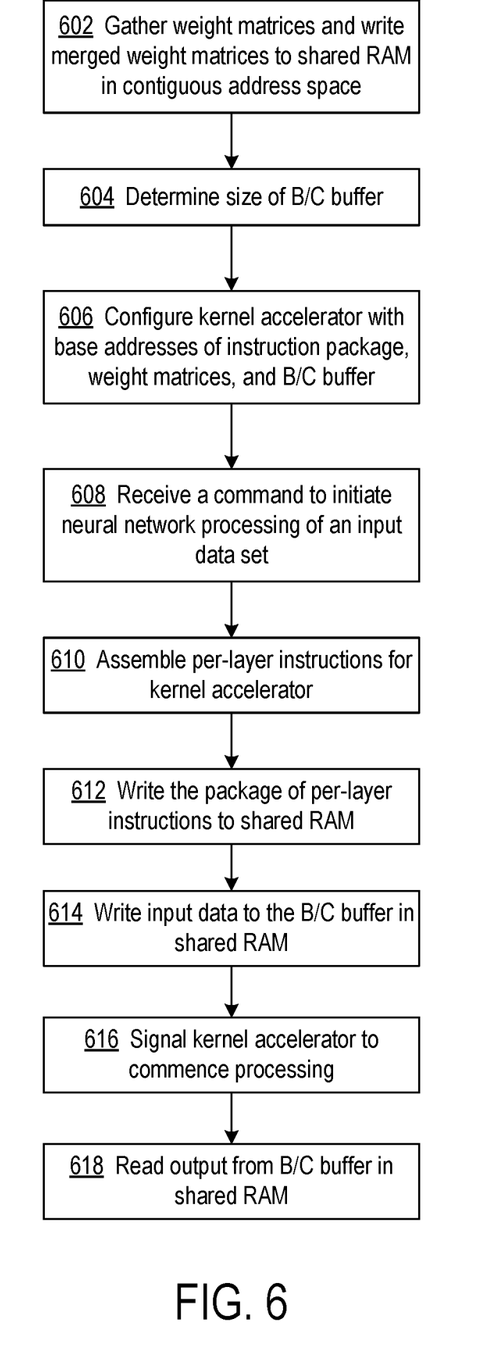
FIG. 6 shows a flowchart of a process performed by the KA interface in configuring the neural network accelerator for processing a package of per-layer instructions and providing the weights, input data, and package of per-layer instructions to the neural network accelerator for processing.

FIG. 6 shows a flowchart of a process performed by the KA interface in configuring the neural network accelerator for processing a package of per-layer instructions and providing the weights, input data, and package of per-layer instructions to the neural network accelerator for processing.

At block 602, the KA interface gathers the weight matrices needed for performing the operations of the layers of the neural network. The weight matrices can be obtained from the specification of the neural network in the ML framework 410. Each layer of the neural network has an associated weight matrix. The KA interface writes the collection of weight matrices in a block of contiguous address space of the RAM 226.

The KA interface 412 determines the size of the B/C buffer at block 604. In an exemplary implementation, the KA interface scans the specification of the neural network as set forth by the ML framework 410. In scanning the specification, the KA interface searches for definitions of the B and C matrices in the different layers of the neural network and determines the maximum size of the B and C matrices. The size of the B/C buffer is computed to be twice the maximum size of the B and C matrices. In an application in which the neural network accelerator processes multiple sets of input data, such as a batch of images, the size of the B/C buffer can be:

2*max(B, C)*num-sets where max (B, C) is the maximum size of the B and C matrices, and num-sets is the number of sets of input data such as RGB channels of an image.

At block 606, the KA interface configures the neural network accelerator with the base addresses in the RAM 226 of the weight matrices, the instruction package, and the B/C buffer. The neural network accelerator can be configured by writing the base addresses to the configuration registers 408.

The KA interface at block 608 receives a command from the ML framework to run input data set(s) through the layers of neural network. In response to the command, at block 610, the KA interface assembles per-layer instructions into a package of instructions, and the per-layer instructions are generated based on the specification of the neural network defined by the ML framework. For example, in a particular application, the ML framework defines the neural network operations in the layers as follows:

Convolution 1
ReLu 1
MaxPool 1
Convolution 2
ReLu 2
MaxPool 2
Convolution 3
ReLu 3
Convolution 4
ReLu 4
Convolution 5
ReLu 5
MaxPool 5
FC 6
FC 7
FC 8 where each integer indicates the layer in the neural network. Layers can be numbered from 1 in algorithmic description, and from 0 in a specific implementation. Both descriptions are interchangeable. Based on the definition of the neural network layers, the KA interface prepares the per-layer instructions to include in the instruction package. For example, the per-layer instruction for layer 2 of an Alexnet convolutional neural network based on the foregoing exemplary neural network definition is as follows:

M: 192
N: 5832
K: 1600
scaleFPGAC: 26
A_offset: 24567
do im2col: 2
batch size: 8
img ch: 64 w: 27 w_padded: 32 h:27
out w: 27 w_padded: 32
maxpool: 2
relu: true In the exemplary per-layer instruction, the value associated with M specifies the number of rows in the weight matrix A and the number of rows in the output matrix C. The value associated with N specifies the number of columns of the image matrix B and output matrix C. The value associated with K specifies columns of A and rows of B. The value associated with scaleFPGAC specifies a scaling factor used to scale the computed values from layer 2 for use in layer 3. The value associated with A_offset specifies the offset from the base address of the weight matrices 520 at which the weight matrix for layer 2 is found.

The parameter, "do im2col: 2" specifies that layer 2 geometry image-to-column formatting should be performed. The parameter, "batch size: 8" specifies that 8 sets of input data are to be processed. The parameters, "img ch: 64 w: 27 w_padded: 32 h: 27" specifies the number of channels in the input data set at layer 2. The parameters, "out w: 27 w_padded:32" specify padding of input data to align with data sizes needed by the compute array. The parameter, "maxpool: 2" specifies that the layer 2 maxpool operation should be performed. The parameter, "relu: true" specifies that the layer 1 relu operation should be performed.

Once the per-layer instructions have been assembled for all the layers of the neural network, at block 612, the KA interface writes the package of per-layer instructions to the RAM 226. At block 614, the KA interface writes the input data to the B/C buffer in the RAM, and once the instruction package and input data have been written to the RAM, at block 616 the KA interface signals the neural network accelerator to commence processing the input data through the neural network. In response to the neural network accelerator signaling completion of processing, at block 618, the KA interface reads the output data from the B/C buffer in the RAM.

Figure 7:
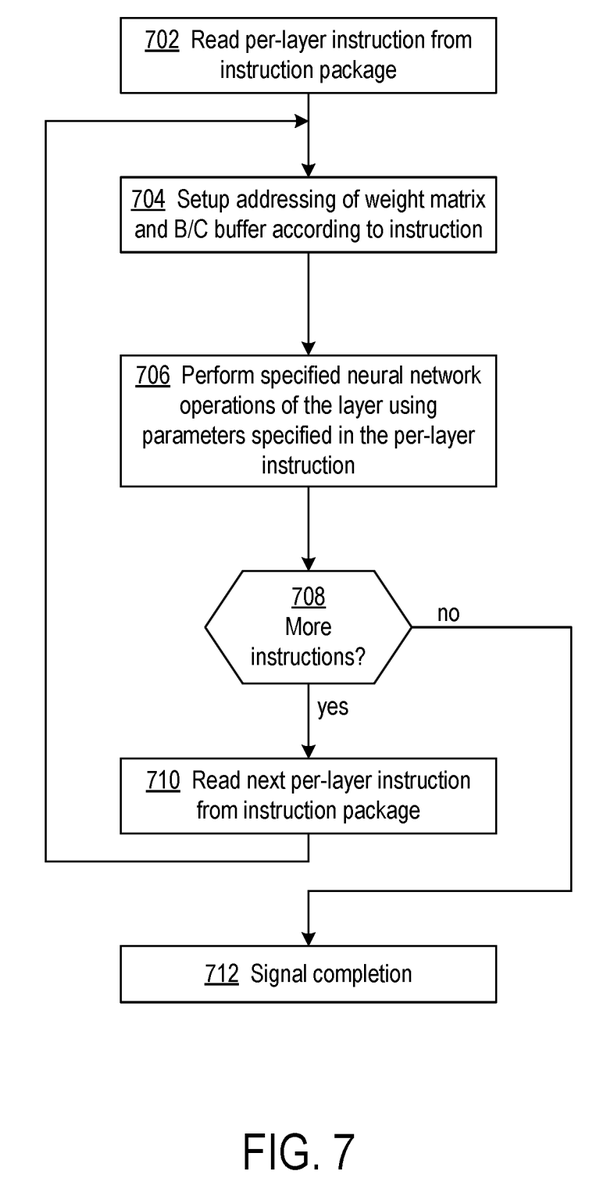
FIG. 7 shows a flowchart of a process performed by the neural network accelerator in processing a package of neural network instructions.

FIG. 7 shows a flowchart of a process performed by the neural network accelerator in processing a package of neural network instructions. At block 702, the neural network accelerator 238 reads a per-layer instruction from the instruction package 516. The addressing of the specified weight matrix and the addresses into the B/C buffer for input and output data are established by the neural network accelerator at block 704. The address of the weight matrix is determined as the base address of the merged weight matrices 520 and the offset specified by the per-layer instruction.

The B/C buffer is used to store both input data and output data, and the output data from one layer of the neural network is the input data to the next successive layer. A base input address references the base address of the input data in the B/C buffer for the current layer, and the base output address references the base address of the output data in the B/C buffer for the current layer. As processing transitions from one layer to the next successive layer, the addresses used for the base input address and base output address are swapped. The address swapping scheme eliminates the copying of data when transitioning the neural network accelerator from the processing of one layer to the processing of the next layer.

At block 706, the neural network accelerator performs the neural network operations specified in the per-layer instruction using the specified parameters. In the exemplary per-layer instruction shown above, the convolution, matrix multiplication, im2col, maxpool, and relu operations are performed. The neural network accelerator determines at decision block 708 whether or not there are more per-layer instructions to be processed. If so, at block 710 the neural network accelerator reads the next instruction from the instruction package and returns to block 704 to setup for the next instruction. Otherwise, neural network accelerator processing of the input data is complete, and at block 712 the neural network accelerator signals completion to the host.

Figure 8:
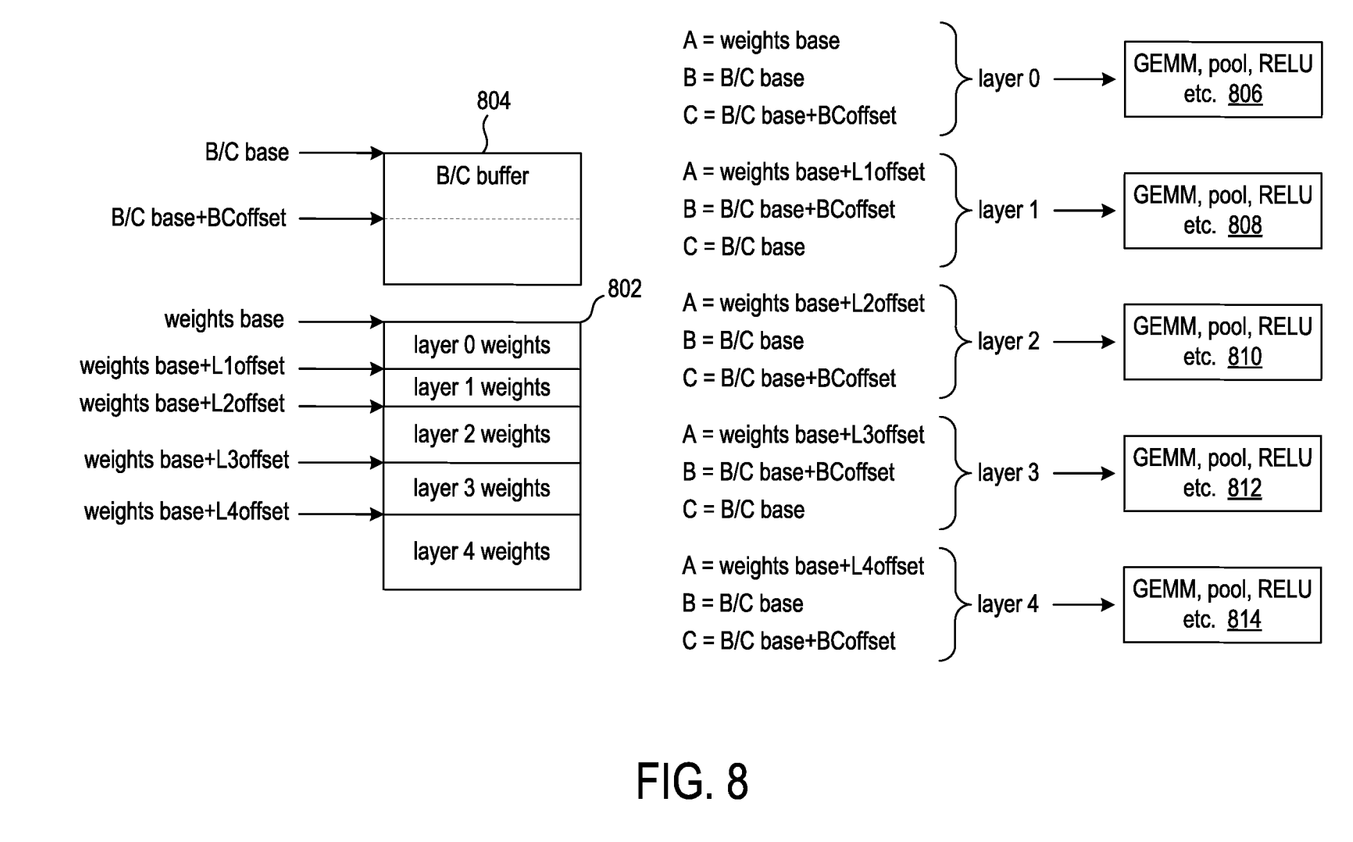
FIG. 8 shows the addressing of exemplary weight matrices and the addressing of an exemplary input/output buffer ("B/C buffer") for five neural network layers.

FIG. 8 shows the addressing of exemplary weight matrices 802 and the addressing of an exemplary input/output buffer ("B/C buffer") 804 for five neural network layers, numbered 0-4. The base address of the weight matrices 802 is labeled "weights base," and the layer 0 weights are stored beginning at weights base. The weight matrices for layers 1-4 are stored beginning at respective offsets from weights base. The layer 1 offset is "L1offset," the layer 2 offset is "L2offset" etc. The base address of the B/C buffer is labeled "B/C base," which is used as a base address of a first portion of the B/C buffer, and the address of a second portion of the B/C buffer is at B/C base+BCoffset.

Blocks 806, 808, 810, 812, and 814 represent the processing performed by the neural network accelerator 238 in performing the specified neural network operations in layers 0-4, respectively. A, B, and C show the address inputs to each layer. A is the base address of the weight matrix, B is the base address of the input data matrix, and C is the base address of the output data matrix.

For layer 0, the base address of the weight matrix is weights base, the base address of the input matrix is B/C base, and the base address of the output matrix is B/C base+BCoffset. Moving to layer 1, the layer 1 instruction would specify L1offset as the offset of the weight matrix for layer 1, and the base address of the weight matrix for layer 1 would be weights base+L1offset. The base address of the weight matrix is adjusted for input at each layer according to the specified offset in the per-layer instruction.

The addresses of the B and C matrices are swapped in transitioning from layer 0 to layer 1, and the output from layer 0 becomes the input to layer 1. The portion of the B/C buffer used for input to layer 0 becomes the portion for output from layer 1. Specifically, the base address of the input matrix changes to B/C base+BCoffset, and the base address of the output matrix changes to B/C base. In the example, even numbered layers input data from the portion of the B/C buffer based at B/C base and output data to the portion of the B/C buffer based at B/C base+BCoffset. Odd numbered layers input data from the portion of the B/C buffer based at B/C base+BC offset and output data to the portion of the B/C buffer based at B/C base.

Figure 9:
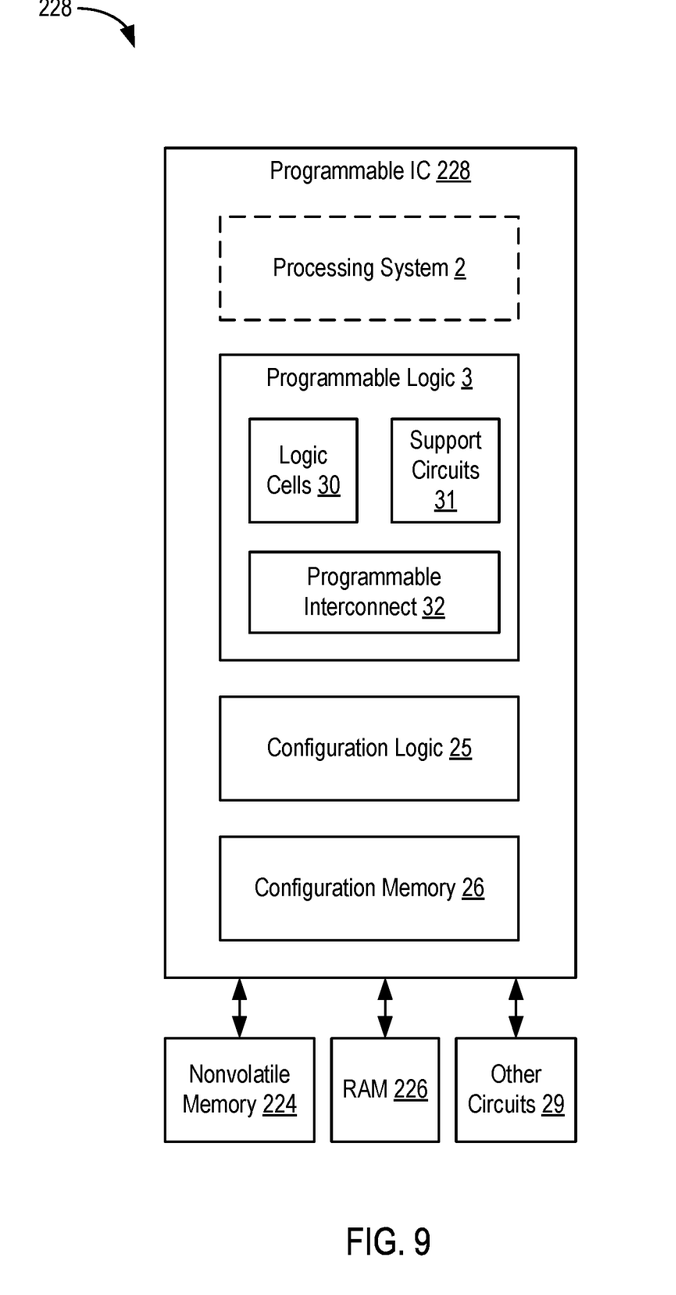
FIG. 9 is a block diagram depicting a programmable IC according to an example.

FIG. 9 is a block diagram depicting a programmable IC 228 according to an example. The programmable IC 228 includes programmable logic 3, configuration logic 25, and configuration memory 26. The programmable IC 228 can be coupled to external circuits, such as the NVM 224, the RAM 226, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 224 or any other source (e.g., the DRAM 226 or from the other circuits 29). In some examples, the programmable IC 228 includes a processing system 2. The processing system 2 can include microprocessor(s), memory, support circuits, IO circuits, and the like. For example, the processing system 2 can include circuits similar to the processing system 210. In some examples, the processing system 2 can be used in place of the processing system 210. In such case, the entire computing system 108 can be implemented using the programmable IC 228, where the software 206 executes on the processing system 2.

Figure 10:
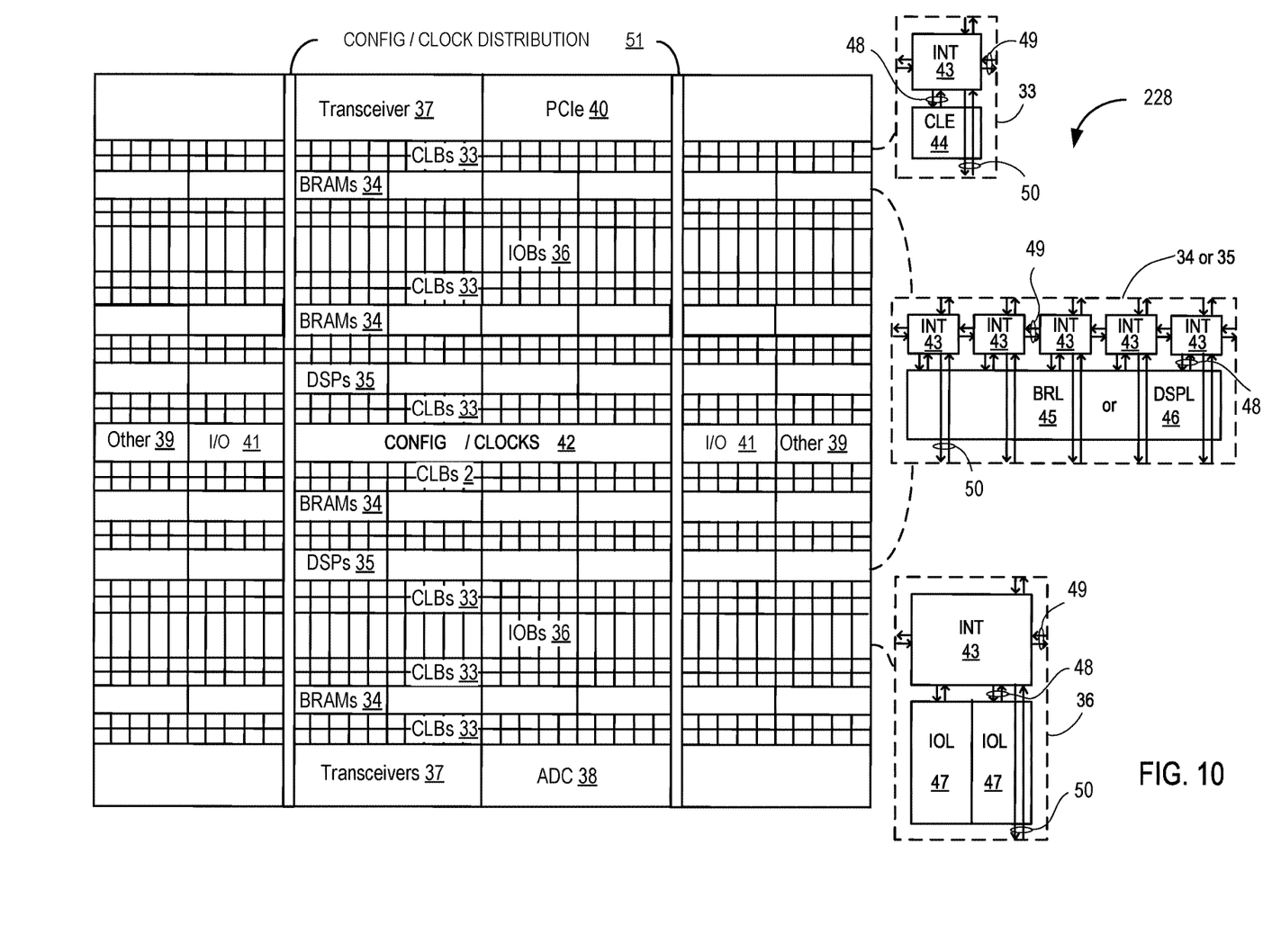
FIG. 10 illustrates an FPGA implementation of a programmable IC.

FIG. 10 illustrates an FPGA implementation of the programmable IC 228 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 10. Each programmable interconnect element 43 can also include connections to interconnect segments 49 of adjacent programmable interconnect element(s) in the same tile or other tiles. Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG.

10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for neural network processing. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   merging, by a host computer system, a plurality of weight matrices associated with a plurality of layers of a neural network into a block of data;
   writing, by the host computer system, the block of data having the plurality of weight matrices to contiguous address space in a shared memory that is shared with a neural network accelerator;
   assembling a plurality of per-layer instructions into an instruction package by the host computer system, each per-layer instruction specifying processing of a respective layer of the plurality of layers of the neural network and a respective offset of a weight matrix of the plurality of weight matrices in the shared memory;
   writing input data and the instruction package by the host computer system to the shared memory;
   reading the instruction package from the shared memory by the neural network accelerator; and
   processing the plurality of per-layer instructions of the instruction package in succession by the neural network accelerator, wherein the processing includes:
      reading input data from and writing output data to the shared memory in processing each per-layer instruction, and
      swapping a first address of the shared memory from which the input data are read with a second address of the shared memory at which the output data are written after completing processing of a first per-layer instruction and before commencing processing of a second per-layer instruction of the plurality of per-layer instructions; and
   wherein the writing of the block of data having the plurality of weight matrices is before the processing of the plurality of per-layer instructions.

2. The method of claim 1, further comprising communicating from the host computer system to the neural network accelerator a parameter indicative of a base address in the shared memory of the weight matrices.

3. The method of claim 1, further comprising communicating from the host computer system to the neural network accelerator a first parameter indicative of the first address of a shared buffer in the shared memory and a second parameter indicative of the second address by an offset in the shared buffer.

4. The method of claim 3, further comprising:
   determining by the host computer system from a specification of the neural network, a size of the shared buffer based on a maximum of sizes of input matrices and output matrices referenced in the plurality of layers of the neural network.

5. The method of claim 1, wherein the assembling the plurality of per-layer instructions includes specifying in one or more of the per-layer instructions, configuration parameters for scaling, maxpool dimensions, and an activation function.

6. The method of claim 1, wherein the first per-layer instruction and the second per-layer instruction of the plurality of per-layer instructions specify different sets of neural network operations.

7. The method of claim 1, wherein the processing the plurality of per-layer instructions includes processing the plurality of per-layer instructions in the instruction package in order of appearance in the instruction package.

8. The method of claim 1, wherein the processing the plurality of per-layer instructions includes completing execution of instruction i before commencing execution of instruction i+1 for n instructions in instruction package and $1<=i<=n$.

9. The method of claim 1, wherein the processing the plurality of per-layer instructions includes evaluating a finite state machine transition table for a state machine defined by the instruction package.

10. A neural network processing system, comprising:
    a shared memory;
    a neural network accelerator coupled to the shared memory and to a host computer system;
    wherein the host computer system is configured to:
       merge a plurality of weight matrices associated with a plurality of layers of a neural network into a block of data;
       write the block of data having the plurality of weight matrices to contiguous address space in the shared memory;
       assemble a plurality of per-layer instructions into an instruction package, each per-layer instruction specifying processing of a respective layer of the plurality of layers of the neural network and a respective offset of a weight matrix of the plurality of weight matrices in the shared memory; and
       write input data and the instruction package to the shared memory;
    wherein the neural network accelerator is configured to:
       read the instruction package from the shared memory; and
       process the plurality of per-layer instructions of the instruction package in succession by:
          reading input data from and writing output data to the shared memory in processing each per-layer instruction, and
          swapping a first address of the shared memory from which the input data are read with a second address of the shared memory at which the output data are written after completing processing of a first per-layer instruction and before commencing processing of a second per-layer instruction of the plurality of per-layer instructions; and
    wherein the host computer system is configured to write the block of data having the plurality of weight matrices before the processing of the plurality of per-layer instructions by the neural network accelerator.

11. The neural network processing system of claim 10, wherein the host computer system is further configured with instructions that when executed cause the host computer system to communicate to the neural network accelerator a parameter indicative of a base address in the shared memory of the weight matrices.

12. The neural network processing system of claim 10, wherein:
- the host computer system is further configured with instructions that when executed cause the host computer system to:
  - determine from a specification of the neural network, a size of a shared buffer based on a maximum of sizes of input matrices and output matrices referenced in the plurality of layers of the neural network; and
  - communicate to the neural network accelerator a first parameter indicative of the first address of the shared buffer and a second parameter indicative of the second address by an offset in the shared buffer.

13. The neural network processing system of claim 10, wherein the host computer system is configured to specify in one or more of the per-layer instructions, configuration parameters for convolution, matrix multiplication, scaling, maxpool dimensions, and an activation function.

14. The neural network processing system of claim 10, wherein the neural network accelerator in processing the plurality of per-layer instructions, is further configured to process the plurality of per-layer instructions in the instruction package in order of appearance in the instruction package.

* * * * *